United States Patent [19]

Dyball

[11] 4,263,417
[45] Apr. 21, 1981

[54] POLYESTER COMPOSITIONS CONTAINING CROSSLINKABLE COPOLYMERS

[75] Inventor: Christopher J. Dyball, Amherst, N.Y.

[73] Assignee: Pennwalt Corporation, Philadelphia, Pa.

[21] Appl. No.: 63,232

[22] Filed: Aug. 3, 1979

[51] Int. Cl.³ ............................................. C08L 67/06
[52] U.S. Cl. .................................... 525/169; 525/170
[58] Field of Search ........................ 525/169, 170, 171

[56] References Cited

U.S. PATENT DOCUMENTS

| | | | |
|---|---|---|---|
| 3,864,427 | 2/1975 | Nakane et al. | 525/171 |
| 4,059,616 | 11/1977 | Lewis et al. | 526/328.5 X |
| 4,104,241 | 8/1978 | Roberts et al. | 260/40 R |

Primary Examiner—Carman J. Seccuro

[57] ABSTRACT

A vinyl monomer is copolymerized with a multifunctional monomer having one vinyl group and one or more allyl groups whereby the resulting copolymer has active pendant allyl groups. This copolymer is then crosslinked with a polyester. The resulting product has improved thermal dimensional stability and physical properties over those containing simple non reactive thermoplastic additives.

10 Claims, No Drawings

POLYESTER COMPOSITIONS CONTAINING CROSSLINKABLE COPOLYMERS

BACKGROUND OF THE INVENTION

This invention relates to thermosetting resin compositions, in which shrinkage is reduced by the use of thermosetting polymeric additives.

It is well known that when monomers are polymerized, a volume reduction occurs. This shrinkage causes changes in dimensions, internal stresses in the cast article, cracking and/or separation from the mold wall yielding surfaces of inadequate smoothness. Thermoplastic additives are often incorporated into polyester resins in order to reduce shrinkage on curing of these resins. See for example (Fritz M. Wright—New "No Shrink" Polyester Resin for BMC, SMC and Wet Moulding—Paper 12A, 27th Annual Conference Proceedings. . . Reinforced Plastics/Composites Institute (1972)).

Thermosetting additives are also known; U.S. Pat. No. 4,104,241 teaches the use of 2-hydroxyethyl acrylate adducts of poly(styrene co maleic anhydride) as reactive polymeric additives. The preparation of the above additives is a two stage process, it is an object of the present invention to provide compositions for which the polymeric additive is prepared by a single stage process. Such unsaturated polymers as those used in the present composition have been prepared previously (U.S. Pat. No. 4,059,616). However anionic polymerization was employed rather than the free radical type polymerizations preferred here. U.S. Pat. No. 4,059,616 states that free radical polymerization does not yield useful polymers.

STATEMENT OF THE INVENTION

The present invention is directed to:

A. A liquid polymerizable composition consisting essentially of

A polymerizable resin consisting of an ethylenically unsaturated polyester, prepared by esterifying ethylenically unsaturated di- or polycarboxylic acids, their anhydrides, or their acid halides with saturated or unsaturated di- or polyalcohols, and dissolved in 20 to 50 weight percent of a free radically polymerizable monomer or monomers; and 2 to 75 weight percent based on said polymerizable resin of a copolymer having a molecular weight of 1,000 to 100,000 prepared by free radically polymerizing:
 (i) at least one allyl ester, substituted allyl ester, N-allyl substituted amide or N-N-diallyl substituted amide, of an α-β unsaturated carboxylic or dicarboxylic acid; or an alkyl substituted monovinyl aromatic compound.
 (ii) at least one vinly or vinylidene monomer which is polymerizable by free radical polymerization.

B. A process for the preparation of a thermosetting casting comprising curing the composition A.

C. A casting prepared by the process of B wherein the casting has reduced shrinkage.

DETAILED DESCRIPTION OF THE INVENTION

The desirable polymeric additives are multi component copolymers containing units of a monomer of the type:

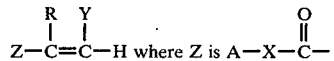

or A—R$_4$ where R$_4$ is aryl of 6–15 carbons.

When Z is A—R$_4$, Y is hydrogen and R is hydrogen or CH$_3$—;

When Z is

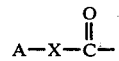

Y is hydrogen or

and R is hydrogen, CH$_3$—, or

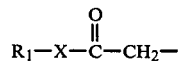

where A is

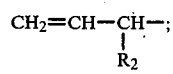

R$_2$ is hydrogen or CH$_3$—;
X is —O— or

R$_3$ is A, hydrogen, alkyl of 1 to 10 carbons, aryl of 6 to 12 carbons, cycloalkyl of 3 to 12 carbons or aralkyl of 7 to 15 carbons;

R$_1$ is A or R$_3$ with the proviso that when Y is

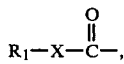

R is hydrogen and when R is

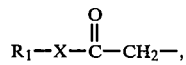

Y is hydrogen.

Representative examples of the allyl containing monomer are:

allyl methacrylate, allyl itaconate, diallyl itaconate, allyl acrylamide, diallyl acrylamide, allyl maleate, diallyl maleate, and 4 allyl styrene.

The above allyl monomer is copolymerized with one or more vinyl and/or vinylidene type monomers which are polymerizable by a free radical mechanism. This includes esters of acrylic and methacrylic acids; vinyl aromatic monomers such as styrene, substituted styrenes such as t-butyl styrene, vinyl toluene, p-methoxystyrene and partially or fully halogenated derivatives of vinyl aromatics (e.g. chloro, fluoro and bromo styrenes etc.). Other operable vinyl monomers include vinyl chloride, vinylidene chloride, tetrafluoroethylene; unsaturated carboxylic acids such as acrylic and methacrylic acids; vinyl esters such as vinyl acetate, vinyl propionate, vinyl stearate etc.; diene monomers such as isoprene, butadiene, chloroprene etc.; anhydrides of unsaturated carboxylic acids such as maleic anhydride; nitriles such as acrylonitrile and methacrylonitrile.

The above monomer or monomers should comprise from 0.1 to 99.9 mole % of the copolymer, preferably from 10 to 99.5 mole %.

The monomers comprising the copolymer which will be used as a polymeric additive in the polyester resin to be cast, will be selected with reference to the glass transition temperature, solubility, physical properties etc. of the copolymer. The copolymer selecton will depend on the desired properties of the final casting.

Preparation of the copolymer

It should be understood that a copolymer is defined as a polymer made from two or more different monomer; this definition include terpolymers such as methyl methacrylate allyl methacrylate maleic anhydride terpolymer.

An allyl monomer from the first group is copolymerized with one or more monomers from the second group. The monomer combination is chosen such that the vinyl unsaturation in the monomer containing the allyl group has similar reactivity to that (those) from the second group. Hence it is possible to prepare random copolymers with pendant unreacted allyl groups, the composition of which copolymers does not change appreciably with conversion.

The copolymerization can be carried out by bulk, solution, suspension or emulsion polymerization.

One or more free radical type initiators are used. The reactivity of such an initiator is generally defined in terms of its ten hour half life temperature. This is the temperature at which one half of the peroxide originally present will decompose in ten hours (see for example Encyclopedia of Polymer Technology, page 826, published by Wiley and Sons 1968). Half life measurements are solvent and concentration dependant.

Half lives are generally measured in a solvent such as benzene, toluene, trichloroethylene etc. at a concentration of about 0.05 to 0.2 M (see above reference). The initiators suitable for use in the present invention have ten hour half lives between 20° and 150° C., suitable examples include:
di-isobutyryl peroxide, lauroyl peroxide, t-butyl peroxy 2 ethyl hexanoate, di-t-butyl peroxy propane, dicumyl peroxide, 2-t-butylazo-2-cyano-4 methoxy 4 methyl pentane or acetyl cyclohexyl sulphonyl peroxide.

Activated systems where decomposition of a peroxide is brought about by means of a promoter are also useable. Such systems include hydroperoxides or ketone peroxides promoted by cobalt salts such as cobalt napthenate and/or amines such as dimethyl aniline. Promoters can also be used with diacyl peroxides such as benzoyl peroxide and peresters such as t-butyl-perbenzoate. Such peroxide or azo initiators are used at a concentration of 0.05–20 wt % on monomer.

Compositions of the present invention are obtained by dissolving or dispersing the copolymers in a polymerizable resin. Polymerizable resins in this context consist of an alkyd portion dissolved in an unsaturated free radically polymerizable monomer(s). The alkyd portion is generally obtained by esterifying preferably ethylenically unsaturated di- or poly-carboxylic acids or their anhydrides or their acid halides, such as maleic acid, fumaric acid, glutaconic acid, itaconic acid, mesaconic acid, citraconic acid, allyl malonic acid, allyl succinic acid, tetrahydrophthalic acid, 2,3-dicarboxybicyclo (2.2.1) heptane and others, with saturated and unsaturated di- or polyalcohols, such as ethylene glycol, diethylene glycol, triethylene glycol, 1,2- and 1,3-propanediols, 1,2-, 1,3- and 1,4-butanediols, 2,2-dimethyl-1,3-propanediol, 2-hydroxymethyl-2-methyl-1,3-propanediol, 2-buten-1,4-diol, 2-butyn-1,4-diol, 2,2,4-trimethyl-1,3-pentanediol, glycerol, pentaerythritol, mannitol and others. Mixtures of such polyacids and/or mixtures of such polyalcohols may also be used. The unsaturated di- or polycarboxylic acids may be replaced, at least partly, by unreactive, saturated polycarboxylic acids, such as adipic acid, succinic acid, sebacic acid and others and/or by aromatic polycarboxylic acids, such as phthalic acid, trimellitic acid, pyromellitic acid, isophthalic acid and terephthalic acid. Also useable are those resins which are terminated by polymerizable unsaturated ester functions, but wherein the polymer repeating units may or may not be of the polyester type, for example polyethers terminated with acrylic acid ester groups. The monomer(s) can be any free radically polymerizable monomer(s) but is preferably selected from styrene and substituted styrenes such as vinyl toluene, p-methyl styrene, p-methoxy styrene, and methyl styrene etc, partially or fully hydrogenated or halogenated styrenes e.g. vinyl cyclohexane, p-chlorostyrene etc.

Such polymerizable resins generally contain from 20–50 wt % of such monomer(s).

The copolymer is added to the resin described above at a concentration of about 2–75 wt %, most preferably 5–50 wt %.

Such copolymer containing resins may be compounded to include fillers, reinforcing agents such as glass fiber, mold release agents and any other materials normally used in polyester resin formulations. The compositions are polymerized by the use of peroxides or azo compounds. The polymerization, often referred to as "curing" may take place at elevated temperatures in a mold. In this case temperatures between 50° and 200° C. are used, suitable initiators include t-butyl perbenzoate, benzoyl peroxide, di(t-butyl-peroxy) propane, dicumyl peroxide, 2-t-butylazo-2-cyano-4-methoxy-4-methyl pentane and 2,5-dimethyl-2,5-bis(2 ethylhexanoylperoxy) hexane. Such initiators are used at a concentration of 0.1–5 wt % most preferably 0.5–2.5 wt % on resin.

Promoted cure systems in which a peroxide is activated at or near ambient temperature are also usable. Such systems include ketone peroxides, or hydroperoxides activated by metal salts such as cobalt napthenate and/or amines such as dimethyl aniline. Alternatively amine type promoters may be used with diacyl peroxides such as benzoyl peroxide or peresters such as t-butyl perbenzoate. In these cases the initiator is used at a concentration of 0.1–5 wt %, preferably 0.5–2.5 wt % on resin, and the promoter at 0.01–1.5 wt %.

For the preparation of cured articles of the compositions of the present invention, the above promoted cure systems are useable, but elevated temperature curing is preferred.

EXAMPLE 1

Preparation of Copolymer

A methyl methacrylate (MMA)/allyl methacrylate (AMA) copolymer was prepared by solution polymerization in toluene. The polymerization was carried out in a sealed 1.5 l reactor equipped with internal heater and magnetic stirrer. The following reactant/solvent quantities were used.

| | |
|---|---|
| Toluene | 600 ml |
| MMA | 294 g |
| AMA | 6 g |
| Lauroyl peroxide | 25 g |
| t-Butyl peroctoate | 10 g |

The initiators were dissolved in a minimum amount of toluene. The remainder of the solvent and monomers were charged to the reactor, and rapidly heated to 75° C., the initiator solution was then added. The reactor was flushed with nitrogen and sealed. The reactor thermostat was set to 95° C., no provision for cooling to dissipate the exotherm was made. The temperature rose to 136° C. in 6½ minutes, resulting in a pressure build up of 60 psi (gauge). After 27 minutes the temperature had dropped to 95° C. and the reaction was held at this temperature for a further 2½ hours. The polymer solution was allowed to cool before running slowly into a large excess of cooled heptane; the precipitated polymer was vacuum dried.

EXAMPLE 2

Preparation and Evaluation of Moldings Containing The Copolymer from Example 1

Glass reinforced moldings were prepared from OCF-E-701* resin with and without the additive; formulations were as follows:

| | (1) | (2) | (3) |
|---|---|---|---|
| OCF-E-701 | 160 g | 160 g | 200 g |
| Copolymer from Example 1 | 40 g | — | — |
| Atomite | — | 40 g | — |
| 2,5 dimethyl-2,5-bis-(2 ethyl hexanoyl peroxy)hexane** | 1.0 phr | 1.0 phr | 1.0 phr |

**Lupersol 256 made by Lucidol Division, Pennwalt Corporation.

*An isophthalic type unsaturated polyester resin dissolved in about 45% by weight of styrene made by Owens Corning Company. The polyester portion of the resin has an acid number of 10.

The test pieces were cured in a press at 265° F. The mold was approximately 5 inches square by ¼ inch deep. 2 sheets of 1½ oz. glass mat were placed in the mold, and the resin formulation poured over them, followed by a thin glass surface veil, then a ⅛ inch sheet of foam and an aluminum cover sheet. The mold was placed in an hydraulic hand operated press for 2 minutes at 265° F. after which time it was removed and cooled under water.

The difficulty of removing the cured pieces from the mold is indicative of the amount of shrinkage. Samples (1) and (2) were difficult to remove, but sample (3) which contains no additive or filler, came out easily as a result of the greater degree of shrinkage.

Using a bandsaw, test pieces were cut from the samples for flexural strength measurements. ASTM method D790-71 was used, the crosshead rate being 0.05 inches per minute, with the exception that the test specimen was 0.75 inches wide rather than the recommended inch. For each sample 5 specimens were tested and the results averaged.

| Sample | Flexural strength (psi) | Modulus of elasticity (psi) |
|---|---|---|
| 1 | 24,595.5 | 854,231.6 |
| 2 | 15,689.4 | 844,690.7 |
| 3 | 20,310.2 | 878,725.5 |

As can be seen, sample 1 which contains the copolymer additive has a higher flexural strength than a sample filled with Atomite or that of an unfilled sample.

EXAMPLE 3

Effect of the Allyl Content of the Copolymers on The Heat Distortion Temperature of Molded Polyester Resins in Which They Are Used (i) Preparation of the Copolymers The copolymers were prepared by solution polymerization in toluene. A three neck round bottom flask equipped with nitrogen bleed, reflux condenser and thermometer was immersed in an oil bath maintained at 71° C. Three separate polymerizations were performed using the following charges:

| | (1) | (2) | (3) |
|---|---|---|---|
| toluene (ml) | 3400 | 3400 | 3400 |
| allyl methacrylate (AMA) (g) | — | 57 | 283.3 |
| methyl methacrylate (MMA) (g) | 566.6 | 510 | 283.3 |
| t-butyl peroxypivalate* (g) | 141.65 | 141.65 | 141.65 |

*Used as a 75% solution in mineral spirits (LUPERSOL 11M75, Lucidol Division, Pennwalt Corporation.)

Each polymerization was continued for 4½ hours under continuous passage of nitrogen, the maximum exotherms were around 90° C. At the end of the polymerization, the toluene solution of the polymer was concentrated on a rotary evaporator before precipitation from heptane. The precipitated polymers were vacuum dried overnight.

(ii) Preparation and Testing of Moldings Containing The Copolymers

Formulations were prepared as follows:

| | |
|---|---|
| OCF-E-701 | 160 g |
| Copolymer | 40 g |
| Atomite | 160 g |
| 2,5 dimethyl-2,5-bis-(2 ethyl hexanoyl peroxy) hexane | 1.6 g |

Using this basic formulations for each of the copolymers, bars 5"×0.5"×0.25" were press molded for two minutes at 265° F. Three moldings were prepared for each formulation.

The heat distortion temperature of each bar was measured according to ASTM method D648-72$^e$ using a maximum fibre stress of 264 psi. The results were averaged over the three bars for each formulation.

Results:

| molding containing copolymer # | heat distortion temperature °C. |
|---|---|
| 1 | 70 |
| 2 | 86 |
| 3 | 96 |

This example demonstrates that the copolymers do not cause the same degree of heat distortion temperature reduction encountered when pure PMMA is used as the shrinkage reducing additive. In this respect the thermosetting copolymer additives are clearly superior to conventional thermoplastic additives.

EXAMPLE 4

Demonstration of the Thermosetting Nature of the Copolymers (i) Preparation of Copolymers Methyl methacrylate (MMA)/allyl methacrylate (AMA) copolymers were prepared by solution polymerization in toluene. The polymerizations were conducted in screw-capped bottles which were flushed with nitrogen before sealing, polymerization time was 3.75 hours at 70° C. At the end of the polymerization, the polymers were isolated by precipitation from heptane and vacuum dried.

Copolymers were prepared from the following charges:

|  | (1) | (2) | (3) |
|---|---|---|---|
| Toluene | 120 ml | 120 ml | 120 ml |
| AMA | 6 g | 9 g | 14 g |
| MMA | 15 g | 11 g | 6 g |
| t-butyl peroxypivalate* | 5 g | 5 g | 5 g |

*used as a 75% solution in mineral spirits (Lupersol 11M75, Lucidol Division, Pennwalt Corporation)

(ii) Preparation and Analysis of Thermosetting Materials.

For each copolymer the following formulation was prepared:

| Copolymer | 5 g |
|---|---|
| Styrene | 5 g |
| t-butyl peroctoate* | 0.1 phm (based on styrene) |
| 2,2 di(t-butyl peroxy) butane** | 0.1 phm |

*Lucidol Division, Pennwalt Corporation
**Used as a 50% solution in dioctyl phthalate (Lupersol 220D50, Lucidol Division, Pennwalt Corporation.

Each solution was charged to a test tube and flushed with nitrogen before sealing. Polymerizations were carried out in an oil bath according to a temperature profile: 2 hrs at 90° C., 2 hrs at 110° C., 1 hr at 135° C., 1 hr at 145° C. The polymerized samples were removed from the tubes, and each was soaked in ~150 ml of toluene for 48 hours. The dissolved portion of the polymer was then precipitated from toluene, dried and weighed. Hence it was possible to calculate the portion of the casting (wt%) which was soluble in toluene.
Results:

| copolymer used | AMA content of polymer (wt %) | % soluble in toluene |
|---|---|---|
| Polymer #2 (example 3) | 10 | 11.8 |
| 1 | 28.4 | 0 |
| 2 | 45 | 0 |
| 3 | 70 | 0 |

Thus the copolymer containing 10% AMA is ~88% crosslinked, and those having higher alkyl methacrylate contents are totally crosslinked.

EXAMPLE 5

Effect of Copolymer Additives on Residual (Unpolymerized) Monomer Content of Polyester Resin Moldings (i) Preparation of An Additional Copolymer A further copolymer was made by the method of example 4 using the following reactants:

| Toluene | 240 ml |
|---|---|
| AMA | 6 g |
| MMA | 34 g |
| t-butyl peroxypivalate | 6 g |

The polymerization was continued for 6 hrs @ 70° C. before isolating the polymer as before.

(ii) Preparation of Polyester Moldings Containing Copolymers

Several copolymer additives were evaluated in the basic resin formulation below.

| OCF-E-701 | 100 |
|---|---|
| Atomite | 67 phr |
| t-butyl perbenzoate | 1.0 phr |

The molding resin was obtained by dissolving 20 parts of a copolymer additive in 80 parts of the basic formulation (unless otherwise stated).

A flat circular sheet with an approximate diameter of 3 inches and a thickness of 0.15 inches was molded using a manually operated Carver press. Two layers of pre cut glass mat (2 oz) were placed in the mold, and a thermocouple inserted between the layers of glass mat. The molding resin (30 g) was poured onto the glass mat and the mold wrapped in aluminum foil (to minimize loss of styrene). The mold was placed in the press, which was then closed to a pressure of 15,000 lbs. The exotherm was followed during the molding cycle. The mold temperature was 149° C. in all cases.

Residual styrene levels were determined by extracting finely crushed samples of the molding with methylene chloride, the styrene content of the extract was then determined by gas chromatography. Samples were crushed in a Waring blender for one minute, 5 g of the crushed sample was weighed into a glass jar, and methylene chloride (75 ml) added. The jar was sealed and allowed to stand for 7 days before analysis of the extract by gas chromatography.
Results:

| Copolymer additive | Wt % AMA in co-polymer | cure time (min) | peak exotherm °C. | residual styrene % |
|---|---|---|---|---|
| Copolymer 1 from Example 3 | — | 0.8 | 182.5 | 0.4 |
| Copolymer from this example | 15 | 0.73 | 194.9 | 0.36 |
| Copolymer 3 from Example 3 | 50 | 0.8 | 196.5 | 0.13 |
| Union Carbide* LP-40-A | — | 0.8 | 206.8 | 1.21 |

*A solution of a thermoplastic additive in styrene (40 wt % styrene). This material was used at 35 wt % in the molding formulation.

It is apparent that the use of the present additives results in lower residual styrene contents than the commercial additive. Furthermore higher allyl contents lead to lower residual styrene content of the molding.

What is claimed:

1. A liquid polymerizable composition consisting essentially of a polymerizable resin consisting of an ethylenically unsaturated polyester, prepared by esterifying ethylenically unsaturated di- or poly-carboxylic acids, their anhydrides, or their acid halides with saturated or unsaturated di- or polyalcohols, and dissolved in 20 to 50 weight percent of a free radically polymerizable monomer or monomers; and 2 to 75 weight percent based on said polymerizable resin of a copolymer having a molecular weight of 1,000 to 100,000 prepared by free radically polymerizing:
(i) at least one member selected from allyl ester, substituted allyl ester, N-allyl substituted amide, N-N-diallyl substituted amide of an alpha-beta unsaturated carboxylic or di-carboxylic acid, or an allyl substituted monovinyl aromatic compounds; with
(ii) at least one vinyl or vinylidene monomer.

2. A liquid polymerizable composition consisting essentially of a polymerizable resin consisting of an ethylenically unsaturated polyester, prepared by esterifying ethylenically unsaturated di- or poly-carboxylic acids, their anhydrides, or their acid halides with saturated or unsaturated di- or polyalcohols, and dissolved in 20 to 50 weight percent of a free radically polymerizable monomer or monomers;

2 to 75 weight percent based on said polymerizable resin of a copolymer having a molecular weight of 1,000 to 100,000 prepared by free radically polymerizing:
(i) at least one compound having the formula $$Z-\overset{R}{\underset{|}{C}}=\overset{Y}{\underset{|}{C}}-H$$

wherein:

Z is selected from

or A—R$_4$—wherein—R$_4$—is an aryl diradical of 6 to 15 carbons with the proviso that: when Z is A—R$_4$—, Y is hydrogen and R is selected from hydrogen or —CH$_3$; and when Z is

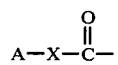

Y is selected from hydrogen or

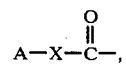

and R is selected from hydrogen, —CH$_3$ or

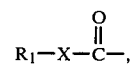

A is

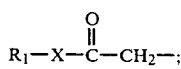

wherein R$_2$ is selected from hydrogen or —CH$_3$;

X is selected from —O— or

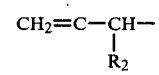

wherein R$_3$ is selected from A, hydrogen, alkyl of 1 to 10 carbons, aryl of 6 to 12 carbons, cycloalkyl of 3 to 12 carbons or aralkyl of 7 to 15 carbons;

R$_1$ is selected from A or R$_3$ with the further proviso that:

when Y is

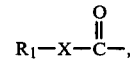

R is hydrogen and when R is

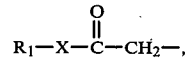

Y is hydrogen; and (ii) at least one monomer selected from alpha-beta unsaturated carboxylic or dicarboxylic acids, their esters, or their anhydrides, vinyl aromatics, dienes, vinyl esters, vinyl chloride, acrylonitrile or methacrylonitrile.

3. The composition of claim 1 wherein at least one of the monomers in the polymerizable resin is selected from styrene or substituted styrene.

4. The composition of claim 2 wherein at least one of the monomers in the polymerizable resin is selected from styrene or substituted styrene.

5. The composition of claim 2 wherein the copolymer is methyl methacrylate-allyl methacrylate copolymer.

6. The composition of claim 2 wherein the copolymer is styrene-allyl methacrylate copolymer.

7. The composition of claim 2 wherein
(i) is at least one of the members selected from the group consisting of allyl methacrylate, allyl itaconate, diallyl itaconate, allyl acrylamide, diallyl acrylamide, allyl maleate, diallyl maleate, allyl fumarate and diallyl fumarate.

8. The composition of claim 2 wherein
(ii) is at least one of the members selected from the group consisting of styrene, vinyl toluene, p-methoxystyrene, vinyl cyclohexane, chloro-, fluoro- or bromo styrene, vinyl chloride, vinylidene chloride, tetrafluoroethylene, acrylic acid, methacrylic acid, vinyl acetate, vinyl propionate, vinyl stearate, isoprene, butadiene, chloroprene, maleic anhydride, acrylonitrile, methacrylonitrile, methyl methacrylate and methyl acrylate.

9. A process for the preparation of a thermosetting casting comprising curing the composition of claim 2.

10. A casting prepared by the process of claim 9 wherein the casting has reduced shrinkage.

* * * * *